United States Patent Office 3,538,171
Patented Nov. 3, 1970

3,538,171
PROCESS FOR THE ISOMERIZATION OF
5-VINYLBICYCLO[2.2.1]HEPT-2-ENE
Wolfgang Schneider, Brecksville, Ohio, assignor to The
B. F. Goodrich Company, New York, N.Y., a corporation of New York
No Drawing. Filed Apr. 7, 1969, Ser. No. 814,178
Int. Cl. C07c 5/28
U.S. Cl. 260—666                   14 Claims

ABSTRACT OF THE DISCLOSURE 5-vinylbicyclo[2.2.1]hept-2-enes heated in the presence of an organotitanium catalyst system are isomerized to 5-ethylidenebicyclo[2.2.1]hept-2-enes. The catalyst system of this invention consists of dicyclopentadienyl titanium dihalide and an organometallic compound or lithium aluminum hydride. The present catalyst system is highly efficient and capable of isomerizing the 5-vinylbicyclo [2.2.1]hept-2-enes within very short periods of time under the conditions of the present process. 5-ethylidenebicyclo [2.2.1]hept-2-enes are useful comonomers for polymerization with α-olefins such as ethylene and propylene.

BACKGROUND OF THE INVENTION

Previously known catalysts for the isomerization of 5-vinylbicyclo[2.2.1]hept - 2 - ene to 5 - ethylidenebicyclo [2.2.1]hept-2-ene have not been completely satisfactory. Large amounts of catalyst were necessary to achieve acceptable rates of isomerization, i.e., poor catalyst efficiency. Attempts to increase the isomerization rate by operating at higher temperatures resulted in breakdown of the catalyst.

SUMMARY OF THE INVENTION

I have now found an improved process for the isomerization of 5-vinylbicyclo[2.2.1]hept-2-enes to 5-ethylidenebicyclo[2.2.1]hept-2-enes wherein high catalyst efficiencies are achieved and the rate of isomerization is significantly increased over catalyst systems heretofore known. The present process utilizes an organotitanium catalyst having excellent thermal stability comprised of a dicyclopentadienyl titanium dihalide and an organometallic compound of Group I-A, II-A, III-A or the Lanthanide Group or Lithium aluminum hydride. The isomerization reaction of this invention may be represented as follows:

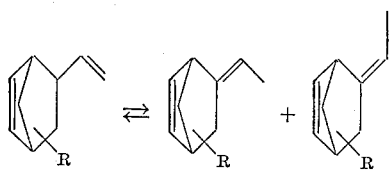

wherein R is a hydrogen or alkyl group containing from 1 to 4 carbon atoms. The process is particularly useful to obtain 5-ethylidenebicyclo[2.2.1]hept-2-ene which is a useful monomer for copolymerization with olefins such as ethylene and propylene.

DETAILED DESCRIPTION 5-vinylbicyclo[2.2.1]hept-2-enes employed in the present isomerization process correspond to the structural formula

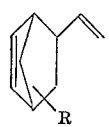

wherein R is a hydrogen or an alkyl group containing from 1 to 4 carbon atoms. The present process is particularly advantageous for the isomerization of 5-vinylbicyclo [2.2.1]hept-2-ene (where R=H) since this material is readily available from the Diels-Alder addition of 1,3-cyclopentadiene and 1,3-butadiene. Other 5-vinylbicyclo [2.2.1]hept-2-enes, such as methyl-5-vinylbicyclo[2.2.1] hept-2-enes obtained from the reaction of 1,3-cyclopentadiene with piperylene or methyl 1,3-cyclopentadiene and butadiene, are isomerized just as effectively by the present process.

The catalyst system employed in the present process comprises an organotitanium compound and an organometallic compound of a Group I-A, II-A, III-A or Lanthanide Group metal or lithium aluminum hydride. The particular organotitanium compounds employed will correspond to the formula

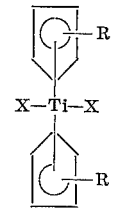

wherein R is a hydrogen or an alkyl group, preferably containing from 1 to 4 carbon atoms, and X is a halide such as chlorine or bromine. The dicyclopentadienyl titanium dihalide compounds and their preparation are described by G. Wilkinson et al. in J. Amer. Chem. Soc., 76, 4281 (1954).

Organometallic compounds typically used with the dicyclopentadienyl titanium dihalide to form the catalysts of this invention are organic compounds of metals of Group I-A, II-A, III-A or the Lanthanide Group of the Periodic Table and particularly lithium, magnesium and aluminum. Particularly useful organometallic compounds are alkyl and aryl magnesium halides, wherein the alkyl group contains from 1 to 12 carbon atoms and aryl groups from 6 to 12 carbon atoms; metal alkyls and metal aryls of lithium, magnesium and aluminum wherein the alkyl group contains from 1 to 12 carbon atoms and the aryl groups from 6 to 12 carbon atoms; and alkyl aluminum hydrides wherein the alkyl group contains from 1 to 12 carbon atoms. Preferably in the above compounds alkyl groups will contain from 1 to 8 carbon atoms and aryl groups from 6 to 9 carbon atoms. Excellent results are obtained when the organometallic compound employed with the organotitanium compound is ethylmagnesium bromide, ethylmagnesium chloride, methylmagnesium iodide, butylmagnesium chloride, phenylmagnesium bromide, benzylmagnesium chloride, methyllithium, isobutyllithium, diethylmagnesium, diphenylmagnesium, triethylaluminum, tripropylaluminum, tri-iso-butylaluminum, tri-n-hexylaluminum, tri-n-octylaluminum, diethylaluminum hydride, dibutylaluminum hydride and the like. Exceptional results have also been obtained with lithium aluminum hydride. In addition to the above-listed compounds, other organometallic compounds are useful to form the isomerization catalysts for the present invention. For example, alkylaluminum fluorides, such as diethylaluminum fluoride, can be employed.

The present catalyst systems are obtained by contacting the dicyclopentadienyl titanium dihalide with the organometallic compound or lithium aluminum hydride. The catalyst may be prepared prior to use or the individual catalyst components may be mixed in the reactor in the presence of the 5-vinylbicyclo[2.2.1]hept-2-ene. If the catalyst system is prepared prior to the isomerization the organotitanium compound and the organometallic compound or lithium aluminum hydride are generally admixed in an inert solvent. This latter method facilitates subsequent storage, handling and charging of the catalyst and is a useful means to control the reaction exotherm.

While large amounts of the dicyclopentadienyl titanium dihalide may be employed, the concentration will generally range from about 5 millimols per mol 5-vinylbicyclo[2.2.1]hept-2-ene to about 0.001 millimol per mol 5 - vinylbicyclo[2.2.1]hept - 2 - ene. Organotitanium compounds up to about 20 millimols, or more, per mol 5-vinylbicyclo[2.2.1]hept-2-ene can be employed if desired, however, no particular advantage is realized with such high levels. Excellent results have been obtained when the concentration of the organotitanium compound is between about 2.5 millimols and 0.01 per mol 5-vinylbicyclo[2.2.1]hept-2-ene. About 2 to 10 mole equivalents and more preferably 2.25 to 5 mol equivalents, of the organometallic compound or lithium aluminum hydride will be employed per mol equivalent of the organotitanium compound. It is often advantageous to employ sufficient excess of the organometallic compound or lithium aluminum hydride so that it will also serve as a scavenger to remove impurities such as oxygen, alcohols, water and the like present in the system.

The isomerization is carried out by heating the 5-vinylbicyclo[2.2.1]hept - 2 - ene in the presence of the organotitanium catalyst. The 5-vinylbicyclo[2.2.1]hept-2-ene is generally charged to the reactor and the pre-formed catalyst or the individual catalyst components added thereto. The catalyst or individual catalyst components may be completely charged at the outset of the isomerization or charged continuously as the isomerization progresses. The process may be conducted employing either batch or continuous techniques. Prior to the introduction of the pre-formed catalyst or the organotitanium compound if the catalyst is to be prepared in situ, an amount of organometallic compound may be charged to the reactor to remove small amounts of undesirable impurities present in the system. The 5-ethylidenebicyclo[2.2.1]hept-2-ene can be recovered by fractional distillation or it may be removed continuously throughout the run if continuous operation is employed.

The isomerization may be conducted in an inert diluent such as the aromatic or saturated aliphatic hydrocarbons. High-boiling saturated hydrocarbons have been employed since they do not interfere with the recovery of the 5-ethylidenebicyclo[2.2.1]hept-2-ene and also permit operation of the process within the desired temperature range without the use of pressure vessels. Useful hydrocarbon solvents include pentane, isopentane, 2,2-dimethylpentane, 2,4-dimethylpentane, 3,3-dimethylpentane, 3-ethylpentane, n-hexane, isohexane, 3-methylhexane, n-heptane, n-octane, isooctane, cyclohexane, benzene, toluene, the xylenes, mesitylene and the like or mixtures thereof. If a diluent is employed the ratio of the dilunet to 5-vinylbicyclo[2.2.1]hept-2-ene will generally range between about 1:10 and about 10:1.

It is not essential that the 5-vinylbicyclo[2.2.1]hept-2-ene be absolutely pure, however, the presence of large amounts of impurities should be avoided for best results. Small amounts of impurities such as water, alcohols, peroxides and air present in the 5-vinylbicyclo[2.2.1]hept-2-ene or diluent can be tolerated, however, it is preferred they be removed by the adition of a scavenging agent, which in this case can also serve as the modifier, or by some other suitable means. Distillation or sieving of the 5-vinylbicyclo[2.2.1]hept-2-ene and diluent prior to use will generally suffice to remove most impurities which seriously impair the catalyst efficiency or promote formation of polymeric materials.

The isomerization process is typically conducted under a dry atmosphere of an inert gas such as nitrogen or argon and may be conducted at atmospheric, sub- atmospheric or superatmospheric pressure depending on the reaction conditions and diluent employed.

The isomerization process is typically conducted at temperatures above 40° C. and up to 300° C. or above. Excellent results, i.e., high catalyst efficiency and a rapid isomerization, generally 90% or more conversion of the 5-vinylbicyclo[2.2.1]hept-2-ene in 5 minutes or less, have been obtained within the temperature range 80 to 225° C. The increased rate of isomerization achieved with the present invention permits the isomerization of 5-vinylbicyclo[2.2.1]hept-2-ene to 5-ethylidenebicyclo[2.2.1]hept-2-ene on a continuous basis. With continuous processes such as those employing tubular reactors and capable of achieving short contact times of the 5-vinylbicyclo[2.2.1]hept-2-ene with the catalyst, temperatures above 250° C. may be desirable. At room temperature the rate of isomeriaztion, although considerably slower than obtained at elevated temperatures, is nevertheless significant and a reasonable degree of conversion can be achieved.

The following examples illustrate the invention more fully, however, they are not intended to limit the scope thereof. All parts and percentages unless indicated otherwise are on a weight basis.

EXAMPLE I

Twenty-eight mls. (0.2 mol) 5-vinylbicyclo[2.2.1]hept-2-ene prepared by the Diels-Alder reaction of 1,3-cyclopentadiene and 1,3-butadiene as described by A. F. Plate and N. A. Belikova in Zhurnal Obshchei Khimii, 30, No. 12, 3945–53 (1960) was charged to a dry argon-purged reactor containing 20 ml. mesitylene and dicyclopentadienyl titanium dichloride (0.125 gram; 0.5 millimol) added at room temperature with stirring while maintaining the argon purge. After charging 0.5 ml. diisobutylaluminum hydride (2.7 millimol) the reactor and its contents were heated to 150° C. under an argon atmosphere. The heating was continued for 30 minutes. The resulting reaction product analyzed by vapor phase chromatography was found to contain 97.2% 5-ethylidenebicyclo[2.2.1]hept-2-ene.

Employing identical amounts of reactants and reaction conditions 1- and 2-methyl-5-vinylbicyclo[2.2.1]hept-2-ene obtained by the Diels-Alder addition of methyldicyclopentadiene with 1,3-butadiene, was 98% isomerized to the corresponding methyl-substituted ethylidenebicyclo[2.2.1]hept-2-enes in 30 minutes.

EXAMPLE II

Identical amounts of reactants as employed in Example I were charged and the 5-vinylbicyclo[2.2.1]hept-2-ene isomerized at 160° C. In this run the 5-vinylbicyclo[2.2.1]hept-2-ene and mesitylene were charged to the reactor and heated to 160° before the addition of the catalyst components. Samples of the reaction mixture were taken at five minute intervals. After 5 minutes 94.2% of the 5-vinylbicyclo[2.2.1]hetp-2-ene had been isomerized. Additional heating for 5 minutes at 160° C. gave 97% isomerization of 5-vinylbicyclo[2.2.1]hept-2-ene. The reaction mixture was heated for a total of 30 minutes after which time 98% of the 5-vinylbicyclo[2.2.1]hept-2-ene was isomerized to 5-ethylidenebicyclo[2.2.1]hept-2-ene.

EXAMPLE III

Employing the procedure of Example I a series of runs were made varying the organometallic compound, the ratio of the catalyst components and the reaction temperature. The isomerizations were conducted for 30 minutes after which time the reaction product was analyzed to determine the percent 5-ethylidenebicyclo[2.2.1]hept-2-ene obtained. The results are tabulated in Table I. The table sets forth the amount of the dicyclopentadienyl titanium dichloride and the type and amount of organometallic compound employed to make up the catalyst for the particular run and the reaction temperature.

hexane maintained at −10° C. and saturated with a gas mixture (30 mol percent ethylene/70 mol percent

TABLE I

| Run No. | 5-vinylbicyclo-[2.2.1]hept-2-ene, mols | Dicyclopentadienyl titanium dichloride, millimols | Organometallic compound | Reaction temp., °C. | Percent yield 5-ethylidenebicyclo[2.2.1]-hept-2-ene |
|---|---|---|---|---|---|
| 1 | 0.1 | 0.25 | LiAlH$_4$ (3 millimols). | 150 | 92 |
| 2 | 0.1 | 0.25 | (n-C$_8$H$_{17}$)Al (2 millimols). | 150 | 98.2 |
| 3 | 0.1 | 0.25 | (C$_2$H$_5$)$_3$Al (1.8 millimols) | 150 | 65 |
| 4 | 0.2 | 0.5 | C$_2$H$_5$MgBr (10 millimols). | 120 | 97.4 |
| 5 | 0.2 | 0.5 | C$_4$H$_9$Li[1] (8 millimols). | 120 | 99.1 |
| 6 | 0.1 | 0.25 | (C$_2$H$_5$)$_2$AlH (1.4 millimols). | 150 | 66 |
| 7 | 0.2 | 0.1 | (i-C$_4$H$_9$)$_2$AlH (2.8 millimols). | 180 | 70 |
| 8 | 0.1 | 0.5 | (C$_2$H$_5$)$_2$AlF (4 millimols). | 150 | 25 |
| 9 | 0.1 | 0.25 | (i-C$_4$H$_9$)$_3$Al (1.5 millimols). | 150 | 70 |

[1] In hexane.

EXAMPLE IV

Following the procedure of Example I, 13.5 ml. 5-vinylbicyclo[2.2.1]hept-2-ene, 13.5 ml. mesitylene, 0.25 ml. diisobutylaluminum hydride (1.35 millimols) and 0.072 gram bis(methylcyclopentadienyl) titanium dichloride (0.25 millimol) were heated at 150° C. for 30 minutes. 30.5% 5-ethylidenebicyclo[2.2.1]hept-2-ene was obtained. When the above run was repeated employing higher catalyst level much higher conversion of the 5-vinylbicyclo-[2.2.1]hept-2-ene was obtained.

EXAMPLE V

Similar to the procedure of Example IV, 13.5 ml. 5-ethylidenebicyclo[2.2.1]hept-2-ene, 13.5 ml. mesitylene, 0.25 ml. diisobutylaluminum hydride and 0.083 gram dicyclopentadienyl titanium dibromide (0.25 millimol) were heated and high yields of 5-ethylidenebicyclo[2.2.1]hept-2-ene obtained after a very short reaction time.

EXAMPLE VI

A catalyst solution was prepared by adding 1.09 grams dicyclopentadienyl titanium dichloride (12.39 millimols) to 420 ml. dry mesitylene. To this suspension was added 4 ml. diisobutylaluminum hydride (22 millimols). Upon the addition of the organometallic compound the organotitanium compound went into solution. The homogeneous catalyst solution which had a distinct blue coloration was then charged (4.8 ml.; 0.05 millimol titanium) to a reactor which had been preheated to 175° C. and containing 13.5 ml. 5-vinylbicyclo[2.2.1]hept-2-ene (0.1 mol), 9 ml. mesitylene and 0.25 ml. diisobutylaluminum hydride. The reaction temperature was maintained at about 180° C. and the rate of isomerization of 5-vinylbicyclo[2.2.1]hept-2-ene measured by vapor phase chromatographic analysis of the reaction mixture. After only 2½ minutes reaction time 61% conversion of the 5-vinylbicyclo[2.2.1]hept-2-ene had been achieved. 86% 5-vinylbicyclo[2.2.1]hept-2-ene was isomerized to 5-ethylidenebicyclo[2.2.1]hept-2-ene after 15 minutes and after 30 minutes reaction this was increased to 95%. Even when the above example was repeated using 0.5 ml. of the catalyst solution (0.005 millimol titanium) with the reaction temperature lowered to about 150° C., about 45% 5-ethylidenebicyclo[2.2.1]hept-2-ene was obtained after only 5 minutes reaction.

Similar active catalysts for the isomerization of 5-vinylbicyclo[2.2.1]hept-2-ene were obtained when triethylaluminum and dicyclopentadienyl titanium dichloride were pre-mixed in heptane.

EXAMPLE VII 5-ethylidenebicyclo[2.2.1]hept-2-ene was polymerized in solution with ethylene and propylene. To 500 ml. propylene) was added 0.813 gram 5-ethylidenebicyclo-[2.2.1]hept-2-ene and a reduced vanadium catalyst system (Al/V mol ratio=167). Throughout the polymerization the gas mixture (30/70) was continuously fed into the polymerizer with continuous agitation so that a concentration of about 30 mol percent ethylene was in the gas phase above the liquid. The polymerization was allowed to run for approximately 15 minutes. Approximately 4½ grams terpolymer was obtained upon precipitation with alcohol. The polymer contained about 33% by weight propylene and about 10% by weight 5-ethylidenebicyclo[2.2.1]hept-2-ene. Compounded polymers of this type are useful in the manufacture of tire carcass. Compounded with about 80 parts black, 40 parts oil, 0.8 part TMTD, 0.4 part MBTS and 1.25 parts sulfur and cured at 320° F., tensiles of about 3000 p.s.i. with about 250% elongation are typically realized.

I claim:

1. A process for the isomerization of 5-vinylbicyclo-[2.2.1]hept-2-enes to 5-ethylidenebicyclo[2.2.1]hept-2-enes which comprises contacting a 5-vinylbicyclo[2.2.1]hept-2-ene of the formula

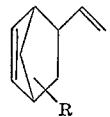

wherein R is a hydrogen or an alkyl group containing from 1 to 4 carbon atoms with a catalyst formed by mixing (1) a dicyclopentadienyl titanium dihalide compound of the formula

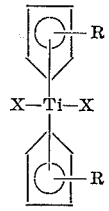

wherein R is hydrogen or an alkyl group containing from 1 to 4 carbon atoms and X is chlorine or bromine and (2) a compound selected from the group consisting of lithium aluminum hydride, alkyl magnesium halides wherein the alkyl group contains from 1 to 12 carbon atoms, aryl magnesium halides wherein the aryl group contains from 6 to 12 carbon atoms, metal alkyls and metal aryls wherein the metal is lithium, magnesium or aluminum, the alkyl group contains from 1 to 12 carbon atoms and the aryl group contains from 6 to 12 carbon atoms, and alkyl aluminum hydrides and alkyl aluminum fluorides wherein the alkyl group contains from 1 to 12 carbon atoms.

2. The process of claim 1 wherein the isomerization is conducted at a temperature between about 40° C. and 300° C. with about 2 to 10 mol equivalents of (2) per mol equivalent of (1).

3. The process of claim 2 wherein the 5-vinylbicyclo[2.2.1]hept-2-ene is 5-vinylbicyclo[2.2.1]hept-2-ene.

4. The process of claim 3 wherein (2) is an alkyl magnesium halide, lithium, magnesium or aluminum alkyl or alkyl aluminum hydride, wherein the alkyl group contains from 1 to 8 carbon atoms; an aryl magnesium halide or a lithium, magnesium or aluminum aryl, wherein the aryl group contains from 6 to 9 carbon atoms; or lithium aluminum hydride.

5. The process of claim 4 wherein the isomerization is conducted in an inert aromatic or saturated aliphatic hydrocarbon diluent at a temperature between about 80° C. and 225° C.

6. The process of claim 5 with about 20 millimols to 0.001 millimol of the dicyclopentadienyl titanium dihalide compound per mol 5-vinylbicyclo[2.2.1]hept-2-ene and about 2.25 to 5 mol equivalents of (2) per mol equivalent dicyclopentdienyl titanium dihalide.

7. The process of claim 6 wherein the inert hydrocarbon diluent is mesitylene.

8. The process of claim 6 wherein about 2.5 millimols to 0.01 millimol dicyclopentadienyl titanium dihalide compound per mol 5-vinylbicyclo[2.2.1]hept-2-ene is employed.

9. The process of claim 8 wherein (1) is dicyclopentadienyl titanium dichloride.

10. The process of claim 8 wherein (1) is dicyclopentadienyl titanium dibromide.

11. The process of claim 8 wherein (1) is bis(methylcyclopentadienyl)titanium dichloride.

12. The process of claim 9 wherein (2) is diethylaluminum hydride.

13. The process of claim 9 wherein (2) is diisobutylaluminum hydride.

14. The process of claim 9 wherein (2) is triisobutylaluminum.

References Cited

UNITED STATES PATENTS

| | | | |
|---|---|---|---|
| 3,151,173 | 9/1964 | Nyce | 260—666 |
| 3,347,944 | 10/1967 | Fritz et al. | 260—666 |
| 3,472,824 | 10/1969 | Nakaguchi et al. | 260—666 |
| 3,211,709 | 10/1965 | Adamek et al. | 260—80.7 |

FOREIGN PATENTS 880,904  11/1957  Great Britain.

DELBERT E. GANTZ, Primary Examiner

V. O'KEEFE, Assistant Examiner